(12) United States Patent
Van Niekerk

(10) Patent No.: US 7,389,634 B1
(45) Date of Patent: Jun. 24, 2008

(54) LINK CHAIN

(75) Inventor: Johannes P. Van Niekerk, Pearland, TX (US)

(73) Assignee: Columbus McKinnon Corporation, Amherst, NY (US)

( * ) Notice: Subject to any disclaimer, the term of this patent is extended or adjusted under 35 U.S.C. 154(b) by 0 days.

(21) Appl. No.: 11/726,587

(22) Filed: Mar. 22, 2007

(51) Int. Cl.
*F16G 13/12* (2006.01)

(52) U.S. Cl. .............................................. 59/78; 59/93

(58) Field of Classification Search .................. 59/78, 59/80, 93
See application file for complete search history.

(56) References Cited

U.S. PATENT DOCUMENTS

| 251,049 | A | * | 12/1881 | Horack ........................... 59/90 |
|---|---|---|---|---|
| 1,848,491 | A | * | 3/1932 | Nourse ........................... 59/90 |
| 2,650,470 | A | * | 9/1953 | Sennholtz ....................... 59/90 |
| 3,453,823 | A | * | 7/1969 | Mundt ............................ 59/90 |
| 4,068,467 | A |   | 1/1978 | Schreyer et al. |
| 4,272,952 | A |   | 6/1981 | Graham |
| 4,497,169 | A | * | 2/1985 | Millington ..................... 59/84 |
| 4,627,232 | A | * | 12/1986 | Bruce ............................ 59/84 |
| 6,170,248 | B1 |   | 1/2001 | Ianello et al. |
| 6,871,486 | B2 | * | 3/2005 | Moehnke et al. ............... 59/78 |
| 6,925,794 | B2 | * | 8/2005 | Dalferth et al. ................ 59/78 |
| 7,107,754 | B2 |   | 9/2006 | Sinz et al. |

* cited by examiner

*Primary Examiner*—David B Jones
(74) *Attorney, Agent, or Firm*—Phillips Lytle LLP

(57) ABSTRACT

A chain comprising at least two links (15) having a generally oval or rounded shaped side profile, each of the links having a longitudinal axis (x-x) and linked together such that a force (16) is applied to each of the links when the chain is in tension, the force generally orientated along the longitudinal axis, each of the links having a cross-sectional profile (18) at the longitudinal axis and the cross-sectional profile having an outer width (19) generally along the longitudinal axis and an outer thickness (20) substantial transverse to the longitudinal axis, wherein the outer width is greater than the outer thickness. The cross-sectional profile may further comprise an inner thickness (30) substantially transverse to the longitudinal axis that is less than the outer thickness (29). The cross-sectional profile (26) may be substantially uniform around the link.

8 Claims, 5 Drawing Sheets

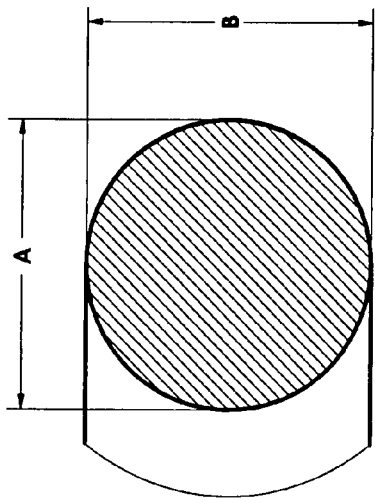
FIG. 3 PRIOR ART
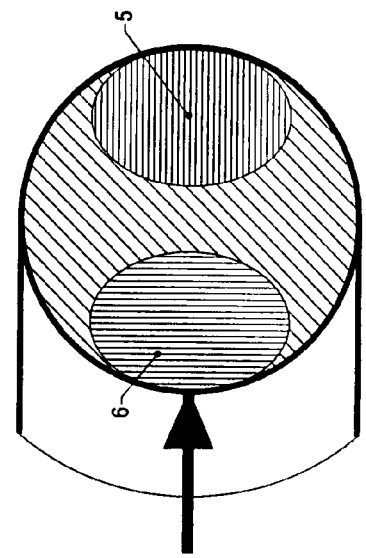
FIG. 5 PRIOR ART
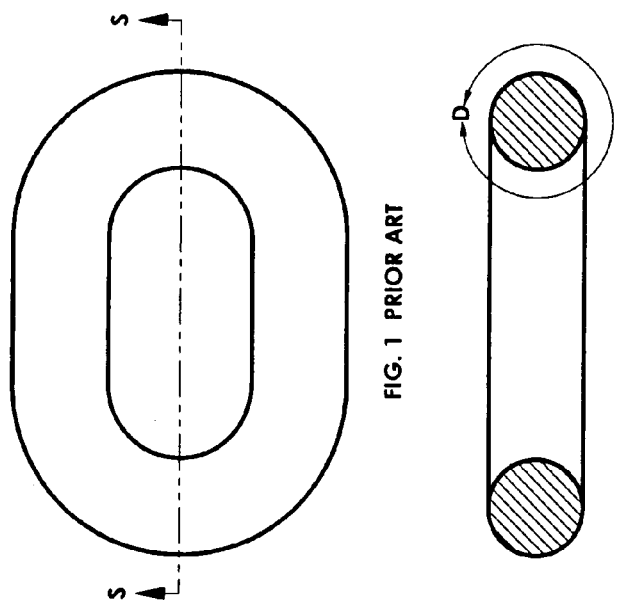
FIG. 1 PRIOR ART
FIG. 2 PRIOR ART
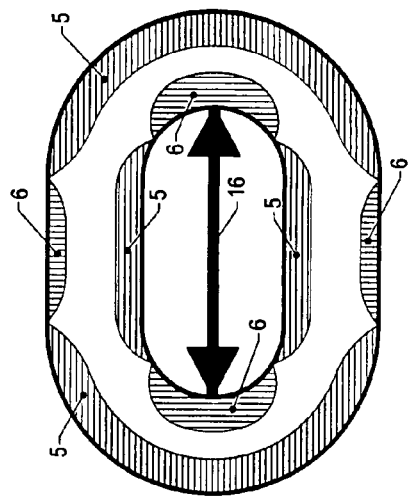
FIG. 4 PRIOR ART

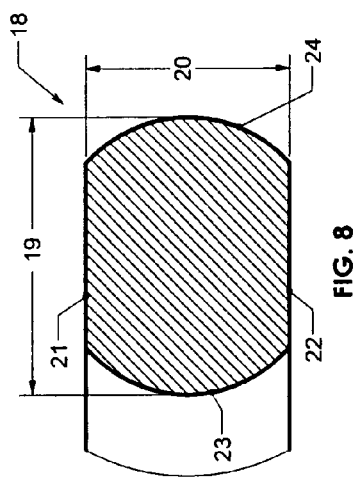
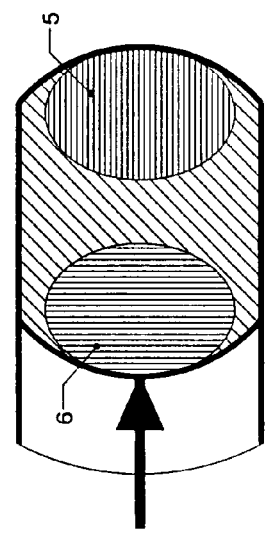
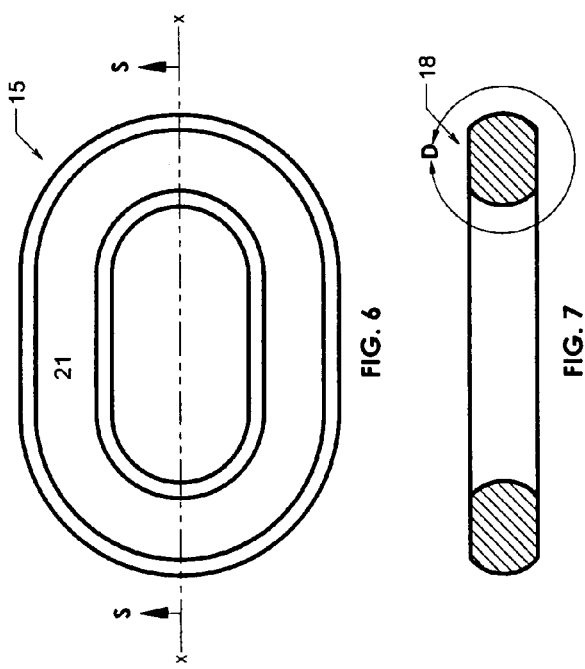
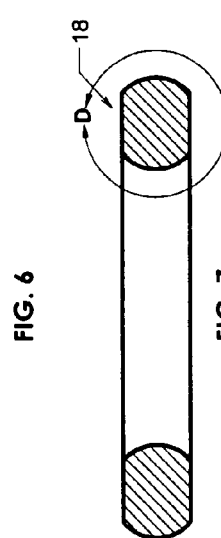
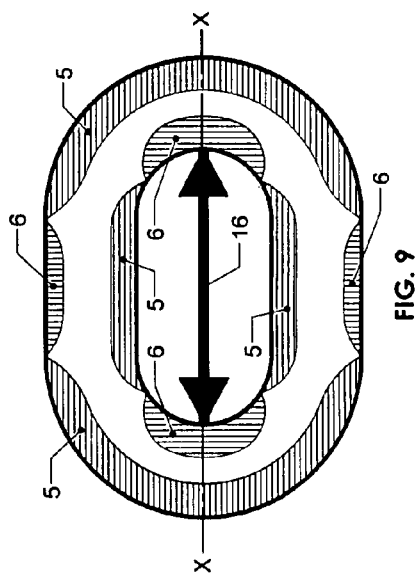

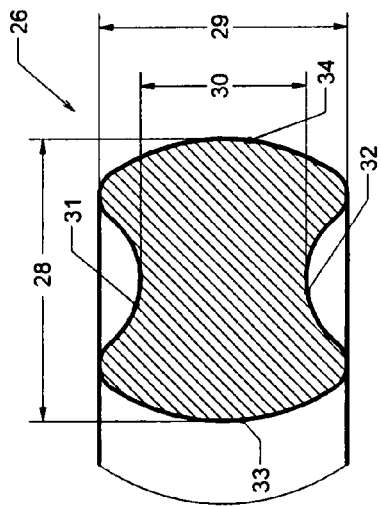
FIG. 13
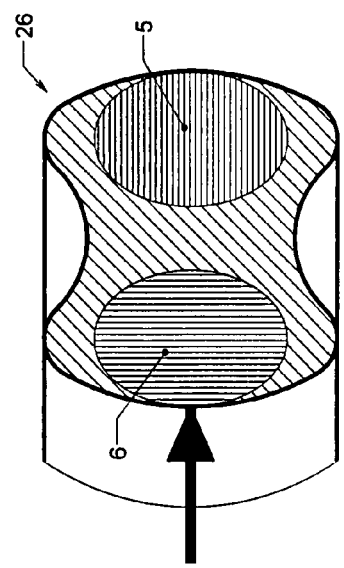
FIG. 15
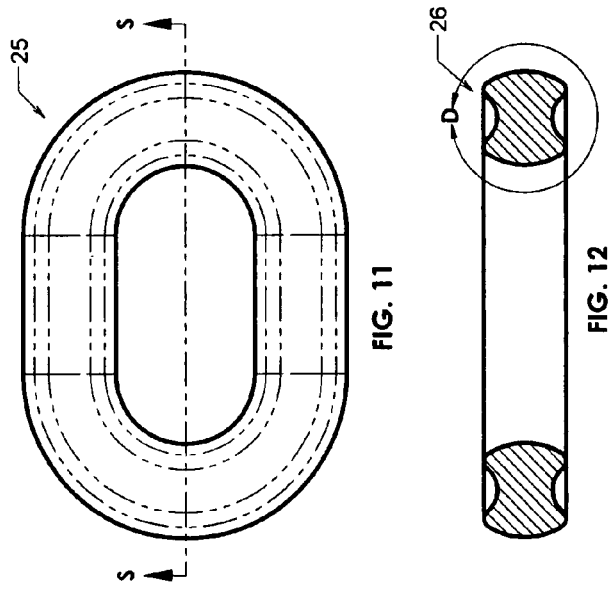
FIG. 11
FIG. 12
FIG. 14

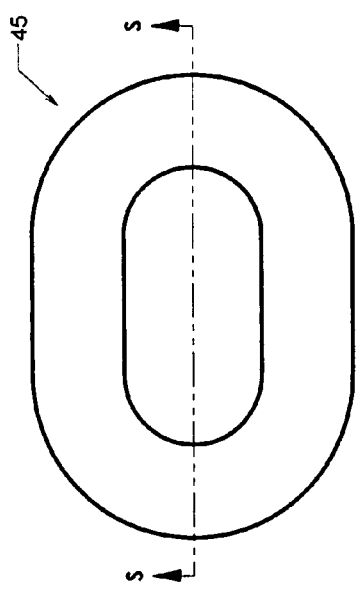
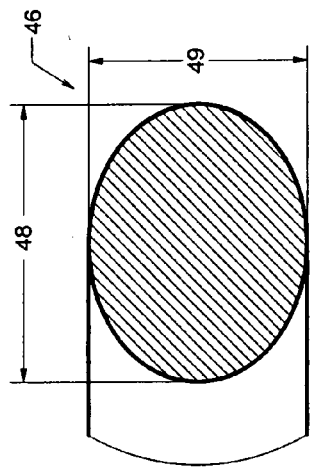
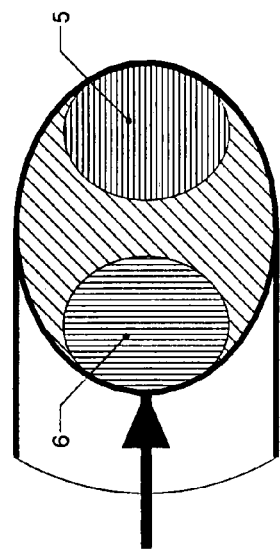
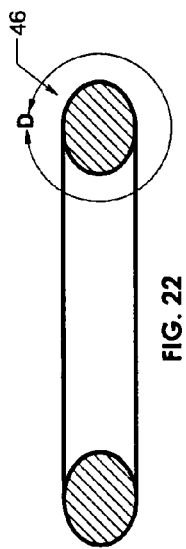
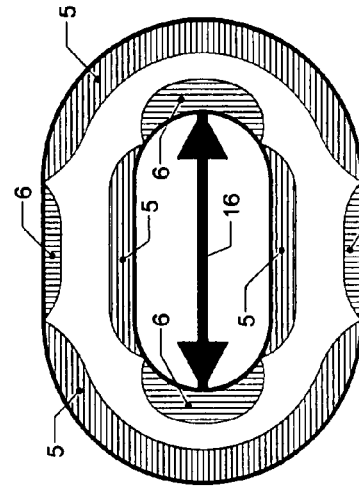
FIG. 21
FIG. 22
FIG. 23
FIG. 24
FIG. 25

LINK CHAIN

TECHNICAL FIELD

The present invention relates generally to the field of chains and, more particularly, to a link chain having improved strength to weight characteristics.

BACKGROUND ART

Link chains are well-known in the prior art. Generally, such chains are made from multiple links that are laced together. In such prior art chains, the links are manufactured from a circular cross-sectional profile of raw material such as steel wire or steel rod. These links generally are of an oblong shape with a parallel shank or barrel portions connected at either end by crown portions. Because a chain link under stress is subjected to bending forces around or at the ends of the link, the stress is mainly located in a radial manner, and concentrated in the central portions of the material between the inside and outside of the ends of the link. However, such chain links are not designed to address the stresses and strains to which the link is most commonly subjected. Thus, they typically are over-built in order to provide adequate strength at the critical areas of the link. Accordingly, there is a need for a lighter but stronger link chain.

DISCLOSURE OF THE INVENTION

With parenthetical reference to the corresponding parts, portions or surfaces of the disclosed embodiments, merely for purposes of illustration and not by way of limitation, the present invention provides an improved chain comprising at least two links (15) having a generally oval or rounded shaped side profile, each of the links having a longitudinal axis (x-x) and linked together such that a force (16) is applied to each of the links when the chain is in tension, the force generally orientated along the longitudinal axis, each of the links having a cross-sectional profile (18) at the longitudinal axis and the cross-sectional profile having an outer width (19) generally along the longitudinal axis and an outer thickness (20) substantially transverse to the longitudinal axis, wherein the outer width is greater than the outer thickness.

The thickness may be defined by a first edge (21) substantially parallel to the longitudinal axis and a second edge (22) substantially parallel to the longitudinal axis. The cross-sectional profile may further comprise an inner thickness (30) substantially transverse to the longitudinal axis that is less than the outer thickness (29). The cross-sectional profile (26) may be substantially uniform around the link. The cross-sectional profile may comprise two edges (33, 34) of a generally convex shape and the width (28) may be defined by the edges. The cross-sectional profile may comprise two edges (31, 32) of a generally concave shape and the thickness (29) may be defined by the edges.

The present invention also provides a chain comprising at least two generally oval or round shaped links (15), each of the links having a longitudinal axis and a substantially uniform cross-section (18) around the link, the cross-section having an outer thickness (20) and a width (19) greater than the outer thickness, the links being linked together such that a force (16) is applied to each of the links when the chain is in tension, the force generally orientated along the longitudinal axis. The thickness may be defined by a first edge (21) substantially parallel to the longitudinal axis and a second edge (22) substantially parallel to the longitudinal axis. The cross-sectional profile (26) may further comprise an inner thickness (30) substantially transverse to the longitudinal axis that is less than the outer thickness (29).

Accordingly, the general object of the present invention is to provide an improved chain having links with greater strength characteristics.

Another object is to provide a chain which is strengthened more selectively.

Another object is to provide a chain which is not over built.

Another object is to provide a chain having links that are lighter but provide adequate strength at critical areas.

These and other objects and advantages will become apparent from the foregoing and ongoing written specification, the drawings, and the appended claims.

BRIEF DESCRIPTION OF THE DRAWINGS

FIG. 1 is a view of the side profile of a prior art link of chain.

FIG. 2 is a longitudinal vertical cross-sectional view of the prior art link shown in FIG. 1, taken generally on line S-S of FIG. 1.

FIG. 3 is an exploded detail view of the cross-sectional view shown in FIG. 2, taken within the indicated circle D of FIG. 2.

FIG. 4 is a longitudinal horizontal cross-sectional illustration of the stress distribution of the prior art link shown in FIG. 1 under tension.

FIG. 5 is an illustration of the stress distribution of the prior art link view shown in FIG. 3 under tension.

FIG. 6 is a view of a side profile of a first embodiment of the improved link to a link chain.

FIG. 7 is a longitudinal vertical cross-sectional view of the link shown in FIG. 6, taken generally on line S-S of FIG. 6.

FIG. 8 is an exploded detail view of the cross-sectional view shown in FIG. 7, taken within the indicated circle D of FIG. 7.

FIG. 9 is a longitudinal horizontal cross-sectional illustration of the stress distribution of the link shown in FIG. 6 under tension.

FIG. 10 is an illustration of the stress distribution of the link shown in FIG. 8 under tension.

FIG. 11 is a view of the side profile of a second embodiment of the improved link to a link chain.

FIG. 12 is a longitudinal vertical cross-sectional view of the link shown in FIG. 11, taken generally on line S-S of FIG. 11.

FIG. 13 is an exploded detail view of the cross-sectional view shown in FIG. 12, taken within the indicated circle D of FIG. 12.

FIG. 14 is a longitudinal horizontal cross-sectional illustration of the stress distribution of the link shown in FIG. 11 under tension.

FIG. 15 is an illustration of the stress distribution of the link shown in FIG. 13 under tension.

FIG. 21 is a view of a side profile of a fourth embodiment of the improved link to a link chain.

FIG. 22 is a longitudinal vertical cross-sectional view of the link shown in FIG. 21, taken generally on line S-S of FIG. 21.

FIG. 23 is an exploded detail view of the cross-sectional view shown in FIG. 22, taken within the indicated circle D of FIG. 22.

FIG. 24 is a longitudinal horizontal cross-sectional illustration of the stress distribution of the link shown in FIG. 21 under tension.

FIG. 25 is an illustration of the stress distribution of the link shown in FIG. 23 under tension.

DESCRIPTION OF THE PREFERRED EMBODIMENT

Figure 16:
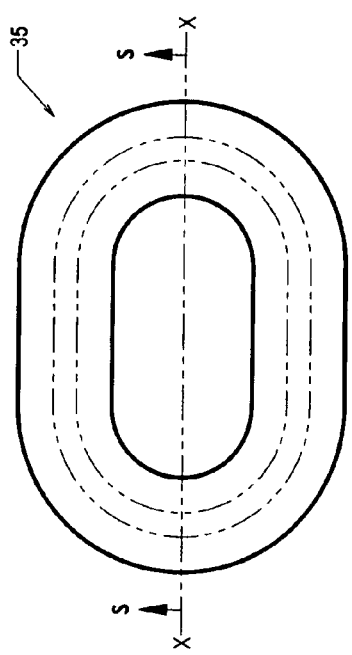
FIG. 16 is a view of the side profile of a third embodiment of the improved link to a link chain.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

FIGS. 1-5 show a chain link already known in the prior art. Such links have a generally oval-shaped side profile, which is shown in FIG. 1. As shown in FIGS. 2 and 3, the cross-sectional profile of the prior art link is circular, such that the width of the profile is the same as the thickness of the profile. FIGS. 4 and 5 show the stress distribution of the prior art link under tension. With reference to FIGS. 4 and 5, tensile stress is generally distributed through the link in the areas severally indicated at 5, and compressive stress is generally distributed in the areas severally indicated at 6. Throughout the figures, vertical hatching designates areas of compressive stress and horizontal hatching designates areas of tensile stress.

FIGS. 6-10 show the preferred embodiment 15 of the improved link. As shown in FIG. 6, the side profile of link 15 is generally of an oval shape, as in the prior art. As illustrated in FIG. 7, link 15 has a cross-sectional profile 18 that is substantially uniform around the entire link 15. However, as shown in FIGS. 7-8, link 15 has a unique flat-sided cross-sectional profile 18, which differs substantially from the prior art. With reference to FIG. 8, profile 18 is bounded by the edges of upwardly-facing surface 21, rightwardly-facing convex surface 24, downwardly-facing surface 22 and leftwardly-facing convex surface 23. Surfaces 21 and 22 are substantially parallel surfaces, and their edges in cross section 18 extend in the same direction as the longitudinal axis x-x of link 15. While surfaces 21 and 22 are shown as parallel surfaces in this embodiment, they could be within thirty degrees of parallel.

As shown in FIG. 8, outer width 19 of cross-sectional profile 18 is the distance between the left outer point of surface 23 and the right outer point of surface 24. Thickness 20 is the distance between surfaces 21 and 22. Thus, thickness 20 is the outer dimension of the profile generally or substantially transverse to longitudinal axis x-x. Width 19 is greater than thickness 20.

As shown in FIG. 10, link 15 uses less material while maintaining strength when force 16 is applied as a result of the chain being in tension during ordinary use. As shown, thickness 20 less than width 19 so that enough material is provided to distribute tensile stress 5 and compressive stress 6 felt by the link when force 16 is applied during ordinary use of the chain.

FIGS. 11-15 show a second embodiment 25. As with first embodiment 15, the side profile of link 25, as shown in FIG. 11, is generally oval shaped. Also as with the first embodiment, link 25 has the same cross-sectional profile 26, shown in FIGS. 12-13, around the entire link 25.

With reference to FIG. 13, cross-sectional profile 26 is bounded by the edges of rightwardly-facing convex surface 34, downwardly-facing concave surface 32, leftwardly-facing convex surface 33 and upwardly-facing concave surface 31. As shown, cross-sectional profile 26 has an outer width 28 in the longitudinal direction and an outer thickness 29 transverse to longitudinal axis x-x. As with the first embodiment, outer width 28 of cross-sectional profile 26 is greater than outer thickness 29 of cross-sectional profile 26. Profile 26 also has an inner thickness 30 that is less than outer thickness 29. Thickness 30 extends from the inner point on surface 31 to the inner point on surface 32.

As shown in FIGS. 14-15, link 25 is configured to adequately distribute both tensile stress 5 and compressive stress 6 when load 16 is applied during ordinary use of the chain. As shown in FIG. 15, cross-sectional profile 26 more closely follows the contours of the cross-sectional stress distribution when force 16 is applied to link 25.

Figure 17:
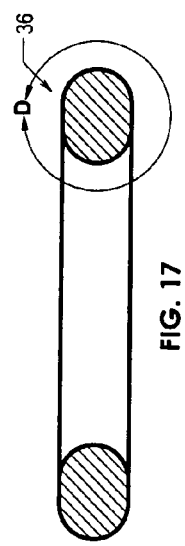
FIG. 17 is a longitudinal vertical cross-sectional view of the link shown in FIG. 16, taken generally on line S-S of FIG. 16.
Figure 18:
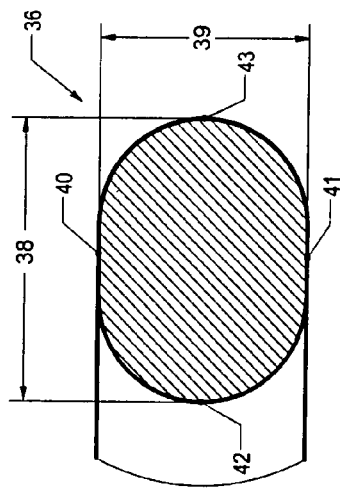
FIG. 18 is an exploded detail view of the cross-sectional view shown in FIG. 17, taken within the indicated circle D of FIG. 17.
Figure 19:
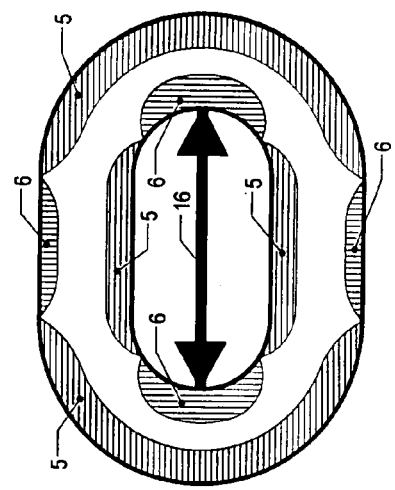
FIG. 19 is a longitudinal horizontal cross-sectional illustration of the stress distribution of the link shown in FIG. 16 under tension.
Figure 20:
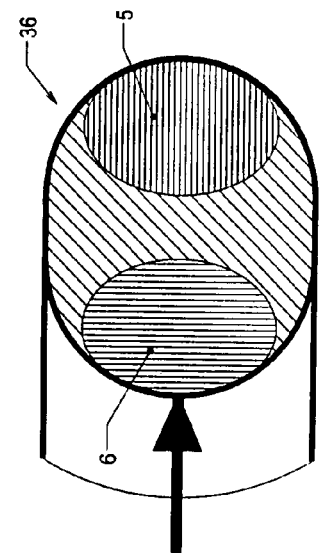
FIG. 20 is an illustration of the stress distribution of the link shown in FIG. 18 under tension.

FIGS. 21-25 show a third embodiment 35. As with the first two embodiments, link 35 has the generally oval-shaped side profile shown in FIG. 16 and has substantially the same cross-sectional profile 36 around the entire link. As shown in FIGS. 17 and 18, link 35 also has a generally oval cross-sectional profile 36 at longitudinal axis x-x. With reference to FIG. 18, profile 36 has a width 38 extending between the outer points on left and right semi-circular surfaces 42 and 43, and thickness 39 is the distance between upper and lower surfaces 40 and 41 that extend between the semi-circular surfaces 42 and 43. As with all the embodiments, width 38 is greater than thickness 39. FIGS. 19 and 20 show the stress distribution for link 35 under ordinary load conditions.

FIGS. 21-25 show a fourth embodiment 45. Embodiment 45 has a generally oval side profile, as shown in FIG. 21. The cross-sectional profile 46 of link 45, as shown in FIGS. 22 and 23, has a generally elliptical shape. With reference to FIG. 23, width 48 is the length of the major axis of profile 46. Thickness 49 is the length of the minor axis of profile 46. Width 48 is greater than thickness 49. FIGS. 24 and 25 show the stress distribution for link 45 under ordinary load conditions.

As shown, when linked together to form a chain, each of the links of the embodiments of the present invention provide for a lighter chain having appropriate strength to provide stress distribution when tensile force 16 is applied to the chain and individual links in ordinary use.

The present invention contemplates that many changes and modifications may be made. Therefore, while the presently preferred form of the link and chain has been shown and described, and several embodiments thereof discussed, persons skilled in this art will readily appreciate that various additional changes and modifications may be made without departing from the spirit of the invention, as defined and differentiated by the following claims.

What is claimed is:

1. A chain comprising:
   at least two links having a generally oval or round shaped side profile;
   each of said links having a longitudinal axis and linked together such that a force is applied to each of said links when said chain is in tension, said force generally oriented along said longitudinal axis;
   each of said links having a cross-sectional profile at said longitudinal axis and said cross-sectional profile having an outer width generally along said longitudinal axis and an outer thickness substantially transverse to said longitudinal axis;
   wherein said width is greater than said outer thickness and said cross-sectional profile is substantially uniform around said link.

2. The chain set forth in claim 1, wherein said thickness is defined by a first edge substantially parallel to said longitudinal axis and a second edge substantially parallel to said longitudinal axis.

3. The chain set forth in claim 1, wherein said cross-sectional profile further comprises an inner thickness substantially transverse to said longitudinal axis that is less than said outer thickness.

4. The chain set forth in claim 1, wherein said cross-sectional profile comprises two edges of a generally convex shape and said width is defined by said edges.

5. The chain set forth in claim 1, wherein said cross-sectional profile comprises two edges of a generally concave shape and said thickness is defined by said edges.

6. A chain comprising:
   at least two generally oval or round shaped links;
   each of said links having a longitudinal axis and a substantially uniform cross-section around said link;
   said cross-section having an outer thickness and a width greater than said outer thickness; and
   said links being linked together such that a force is applied to each of said links when said chain is in tension, said force generally oriented along said longitudinal axis.

7. The chain set forth in claim 6, wherein said thickness is defined by a first edge substantially parallel to said longitudinal axis and a second edge substantially parallel to said longitudinal axis.

8. The chain set forth in claim 6, wherein said cross-sectional profile further comprises an inner thickness substantially transverse to said longitudinal axis that is less than said outer thickness.

* * * * *